(12) United States Patent
Kubota

(10) Patent No.: US 9,971,419 B2
(45) Date of Patent: May 15, 2018

(54) INTERACTIVE PROJECTOR AND METHOD OF CORRECTING Z-COORDINATE OF THE SAME

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 12 days.

(21) Appl. No.: 15/198,423

(22) Filed: Jun. 30, 2016

(65) Prior Publication Data

US 2017/0034490 A1    Feb. 2, 2017

(30) Foreign Application Priority Data

Jul. 31, 2015    (JP) ................. 2015-151578

(51) Int. Cl.
  *G06F 3/03*     (2006.01)
  *H04N 9/093*    (2006.01)
  *H04N 9/31*     (2006.01)
  *H04N 5/225*    (2006.01)
  *H04N 5/247*    (2006.01)

(52) U.S. Cl.
  CPC .......... *G06F 3/0325* (2013.01); *H04N 5/2256* (2013.01); *H04N 5/247* (2013.01); *H04N 9/093* (2013.01); *H04N 9/3179* (2013.01); *H04N 9/3194* (2013.01)

(58) Field of Classification Search
  CPC .... G06F 3/0325; H04N 9/093; H04N 9/3179; H04N 9/3194
  See application file for complete search history.

(56) References Cited

U.S. PATENT DOCUMENTS

| | | | |
|---|---|---|---|
| 7,236,162 B2 * | 6/2007 | Morrison | G06F 3/0428 178/18.01 |
| 2014/0253884 A1 * | 9/2014 | Kuki | G03B 21/142 353/85 |
| 2015/0294439 A1 * | 10/2015 | Watanabe | G06T 3/005 345/619 |

FOREIGN PATENT DOCUMENTS

JP    2012-150636 A    8/2012

* cited by examiner

*Primary Examiner* — Michael Teitelbaum
(74) *Attorney, Agent, or Firm* — Oliff PLC

(57) ABSTRACT

An interactive projector is provided with a projection section adapted to project an image on a screen surface, a detection section, and a correction section. The detection section detects presence or absence of contact of the pointing element with the screen surface based in a relationship between a difference between a Z-coordinate value of the pointing element and a Z-coordinate value of the screen surface, and a difference threshold value set in advance. The correction section corrects at least one of the Z-coordinate value of the screen surface, the Z-coordinate value of the pointing element, and the difference threshold value based on a history of the Z-coordinate value of the pointing element.

8 Claims, 9 Drawing Sheets

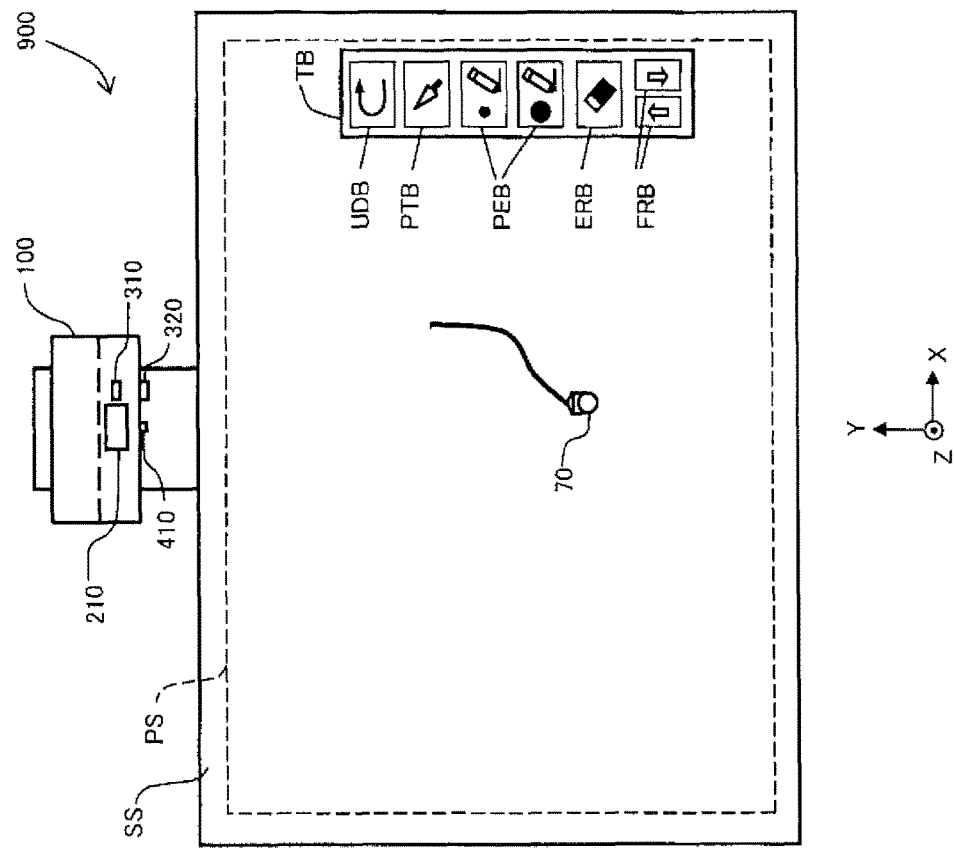
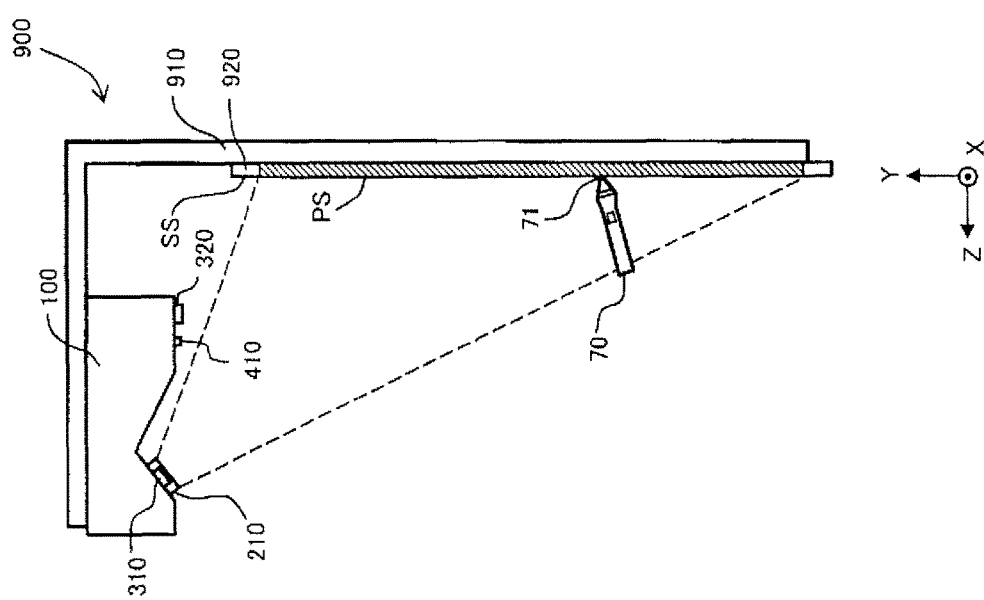

… (ﾉ◕ヮ◕)ﾉ*:･ﾟ✧

INTERACTIVE PROJECTOR AND METHOD OF CORRECTING Z-COORDINATE OF THE SAME

The entire disclosure of Japanese Patent Application No. 2015-151578, filed Jul. 31, 2015 is expressly incorporated by reference herein.

BACKGROUND

1. Technical Field

The present invention relates to an interactive projector capable of receiving an instruction of the user with a pointing element.

2. Related Art

JP-A-2012-150636 discloses a projection display device (projector) capable of projecting a projected screen on a screen, and at the same time taking an image, which includes an object such as a finger, with a camera to detect the position of the object using the taken image. An object such as a finger is used as a pointing element for making an instruction to the projected screen. Specifically, in the case in which the tip of the object has contact with the screen, the projector recognizes that a predetermined instruction such as drawing is input to the projected screen, and then redraws the projected screen in accordance with the instruction. Therefore, it is possible for the user to input a variety of instructions using the projected screen as a user interface. The projector of the type capable of using the projected screen on the screen as a user interface capable of input as described above is referred to as an "interactive projector." Further, the object used for making an instruction to the projected screen is referred to as a "pointing element."

In the typical interactive projector, whether or not an instruction is made using the pointing element is determined in accordance with whether or not the pointing element has contact with the projected screen (the screen surface). Therefore, the accuracy of contact detection of the pointing element to the screen surface is important. However, in the related art, the accuracy of the contact detection is not necessarily sufficient in some cases, and an improvement in the detection accuracy has been desired.

SUMMARY

An advantage of some aspects of the invention is to solve at least apart of the problems described above, and the invention can be implemented as the following aspects or application examples.

(1) According to an aspect of the invention, an interactive projector adapted to detect a position of a pointing element is provided. The interactive projector includes a projection section adapted to project an image on a screen surface, a detection section adapted to detect a three-dimensional coordinate value of the pointing element, and detect presence or absence of contact of the pointing element with the screen surface based on a relationship between a difference between a Z-coordinate value of the pointing element and a Z-coordinate value of the screen surface, and a difference threshold value set in advance, a Z-coordinate being a coordinate in a direction of getting away from the screen surface, and a correction section adapted to correct at least one of the Z-coordinate value of the screen surface, the Z-coordinate value of the pointing element, and the difference threshold value based on a history of the Z-coordinate value of the pointing element.

According to the interactive projector, since at least one of the Z-coordinate value of the screen surface, the Z-coordinate value of the pointing element, and the difference threshold value is corrected based on the history of the Z-coordinate value of the pointing element, even in the case in which a shift occurs in either of the Z-coordinate value of the pointing element and the Z-coordinate value of the screen surface, the shift can be corrected, and it becomes possible to accurately detect presence or absence of the contact of the pointing element with the screen surface.

(2) The interactive projector described above may further include a plurality of cameras each adapted to image a projection range, in which the image is projected, in the screen surface, and the detection section may detect the three-dimensional coordinate value of the pointing element with triangulation using a plurality of images including the pointing element taken by the plurality of cameras.

According to this configuration, the three-dimensional coordinate value of the pointing element can accurately be detected using the triangulation.

(3) In the interactive projector described above, the correction section may perform the correction based on a histogram of the Z-coordinate values of the pointing element.

Since the state in which the pointing element has contact with the screen surface is generally reflected on the histogram of the Z-coordinate values of the pointing element, by arranging that the correction is performed based on the histogram, the detection accuracy of the presence or absence of the contact of the pointing element with the screen surface can be improved.

(4) In the interactive projector described above, the correction section may perform the correction in accordance with a magnitude relation between a Z-coordinate value representing a peak of the histogram of the Z-coordinate values of the pointing element and the Z-coordinate value of the screen surface.

Since the magnitude relation between the Z-coordinate value representing the peak of the histogram and the Z-coordinate value of the screen surface represents the shift of the Z coordinate, by arranging that the correction is performed in accordance with the magnitude relation, the detection accuracy of the presence or absence of the contact of the pointing element with the screen surface can be improved.

(5) In the interactive projector described above, the correction section may perform the correction in accordance with a magnitude relation between a minimum Z-coordinate value in the history of the Z-coordinate value of the pointing element and the Z-coordinate value of the screen surface.

Since the magnitude relation between the minimum Z-coordinate value in the history of the Z-coordinate value of the pointing element and the Z-coordinate value of the screen surface represents the shift of the Z coordinate, by arranging that the correction is performed in accordance with the magnitude relation, the detection accuracy of the presence or absence of the contact of the pointing element with the screen surface can be improved.

(6) In the interactive projector described above, the correction section may perform the correction based on the history of the Z-coordinate values of the pointing element in a case in which a Z-direction speed of the pointing element is zero.

It is conceivable that if the Z-direction speed of the pointing element is zero, the pointing element has contact with the screen surface. Therefore, by arranging that the correction is performed based on the history of the Z-coordinate value of the pointing element in the case in which the Z-direction speed of the pointing element is zero, the detection accuracy of the presence or absence of the contact of the pointing element with the screen surface can be improved.

The invention can be implemented in a variety of configurations such as a system including either one or both of the screen and the pointing element, and the interactive projector, a control method or a control device of the interactive projector, a computer program for realizing the method or the functions of the device, or a non-transitory storage medium storing the computer program.

BRIEF DESCRIPTION OF THE DRAWINGS

The invention will be described with reference to the accompanying drawings, wherein like numbers reference like elements.

FIGS. 2A and 2B are a side view and a front view of the projection system, respectively.

DESCRIPTION OF EXEMPLARY EMBODIMENTS

A. First Embodiment

Figure 1:
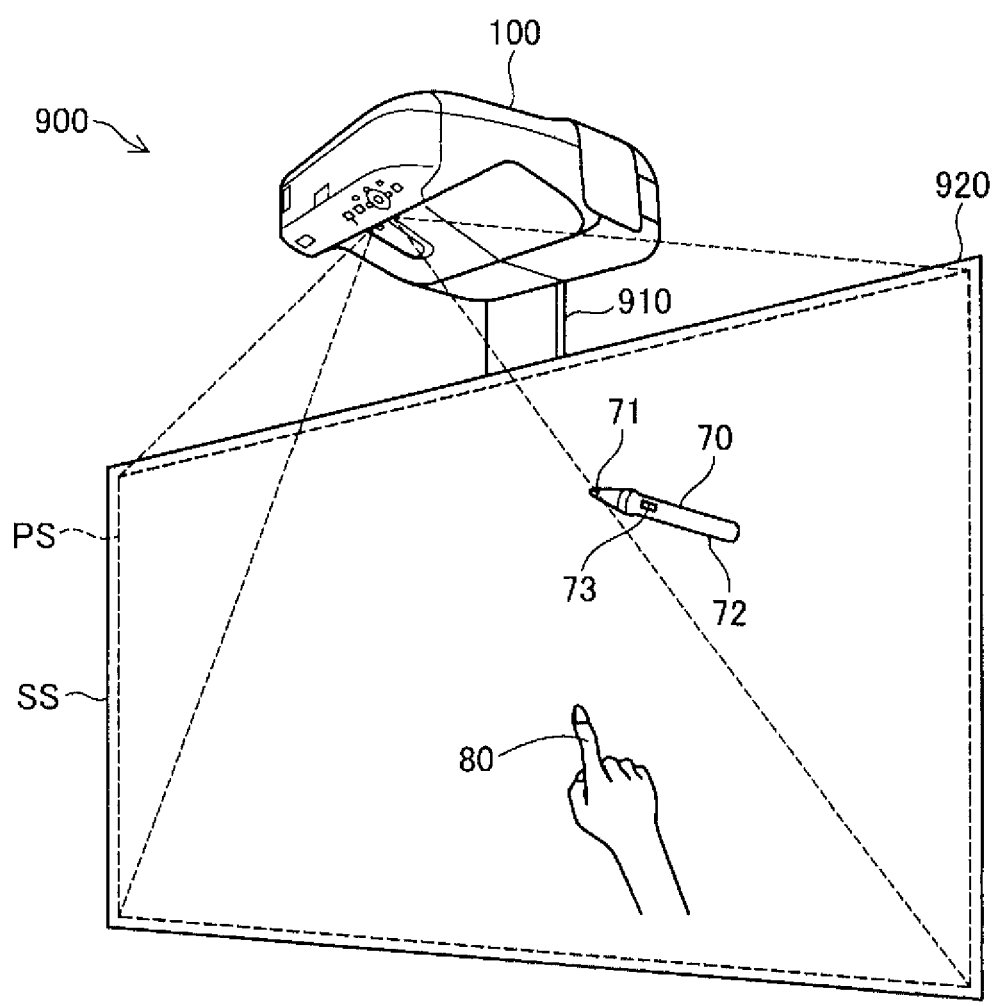
FIG. 1 is a perspective view of a projection system.

FIG. 1 is a perspective view of an interactive projection system 900 according to a first embodiment of the invention. The system 900 has an interactive projector 100, a screen plate 920, and a light-emitting pointing element 70. A front surface of the screen plate 920 is used as a projection screen surface SS. The projector 100 is fixed in front of and above the screen plate 920 with a support member 910. It should be noted that although the projection screen surface SS is vertically arranged in FIG. 1, it is also possible to use the system 900 with the projection screen surface SS arranged horizontally.

The projector 100 projects a projected screen PS on the projection screen surface SS. The projected screen PS normally includes an image drawn inside the projector 100. In the case in which the image drawn inside the projector 100 does not exist, the projector 100 irradiates the projected screen PS with light to display a white image. In the present specification, the "projection screen surface SS" (or a "screen surface SS") denotes a surface of a member on which the image is projected. Further, the "projected screen PS" denotes an area of an image projected on the projection screen surface SS by the projector 100. Normally, the projected screen PS is projected on a part of the projection screen surface SS.

The light-emitting pointing element 70 is a pen-shaped pointing element having a tip portion 71 capable of emitting light, a sleeve part 72 held by the user, and a button switch 73 provided to the sleeve part 72. The configuration and the function of the light-emitting pointing element 70 will be described later. In this system 900, one or more non-light-emitting pointing elements 80 (e.g., non-light-emitting pens or fingers) can be used together with one or more light-emitting pointing elements 70.

FIG. 2A is a side view of the interactive projection system 900, and FIG. 25 is a front view thereof. In the present specification, a direction parallel to a horizontal direction of the projection is defined as an X direction, a direction parallel to a vertical direction of the screen surface SS is defined as a Y direction, and a direction parallel to a normal line of the screen surface SS is defined as a Z direction. It should be noted that the X direction is also referred to as a "horizontal direction," the Y direction is also referred to as a "vertical direction," and the Z direction is also referred to as an "anteroposterior direction" for the sake of convenience. The Z direction is a direction of getting away from the screen surface SS. Further, among directions parallel to the Y direction (the vertical direction), the direction, in which the projected screen PS is located when viewed from the projector 100, is referred to as a "downward direction." It should be noted that in FIG. 2A, the range of the projected screen PS out of the screen plate 920 is provided with hatching for the sake of convenience of graphical description.

The projector 100 has a projection lens 210 for projecting the projected screen PS on the screen surface SS, a first camera 310 and a second camera 320 for taking images of the area of the projected screen PS, and a detection light irradiation section 410 for illuminating the pointing elements (the light-emitting pointing element 70 and the non-light-emitting pointing element 80) with the detection light. As the detection light, near infrared light, for example, is used. The two cameras 310, 320 each have at least a first imaging function of receiving light in a wavelength region, which includes the wavelength of the detection light, to perform imaging. It is preferable for at least one of the two cameras 310, 320 to be further provided with a second imaging function of receiving light including visible light to perform imaging, and to be configured so as to be able to switch between these two imaging functions. For example, it is preferable for each of the two cameras 310, 320 to be provided with a near infrared filter switching mechanism (not shown) capable of placing a near infrared filter, which blocks visible light and transmits only the near infrared light, in front of a lens and of retracting the near infrared filter from the front of the lens. The arrangement and the orientations of the two cameras 310, 320 will further be described later.

The example shown in FIG. 2B shows the state in which the interactive projection system 900 operates in a whiteboard mode. The whiteboard mode is a mode in which the user can arbitrarily draw a picture on the projected screen PS using the light-emitting pointing element 70 and the non-light-emitting pointing element 80. The projected screen PS including a toolbox TB is projected on the screen surface SS. The toolbox TB includes a cancel button UDB for undoing the process, a pointer button PTB for selecting a mouse pointer, pen buttons PEB for selecting pen tools for performing drawing, an eraser button ERB for selecting an eraser tool for erasing the image having been drawn, and forward/backward buttons FRB for feeding the screen forward or backward. By clicking these buttons using the pointing element, the user can perform processes corresponding to the respective buttons, or can select tools corresponding to the respective buttons. It should be noted that it is also possible to arrange that the mouse pointer is selected as a default tool immediately after starting up the system 900. In the example shown in FIG. 2B, there is described the appearance in which a line is being drawn in the projected screen PS by the user selecting the pen tool, and then moving the tip portion 71 of the light-emitting pointing element 70 within the projected screen PS in the state of having contact with the screen surface SS. The drawing operation of the line is performed by a projection image generation section (described later) incorporated in the projector 100.

It should be noted that the interactive projection system 900 can operate in other modes than the whiteboard mode. For example, this system 900 can also operate in a PC interactive mode for displaying an image of the data, which has been transferred from a personal computer (not shown) via a communication line, in the projected screen PS. In the PC interactive mode, an image of the data of, for example, spreadsheet software is displayed, and it becomes possible to perform input, generation, correction, and so on of the data using a variety of tools and icons displayed in the image.

Figure 3:
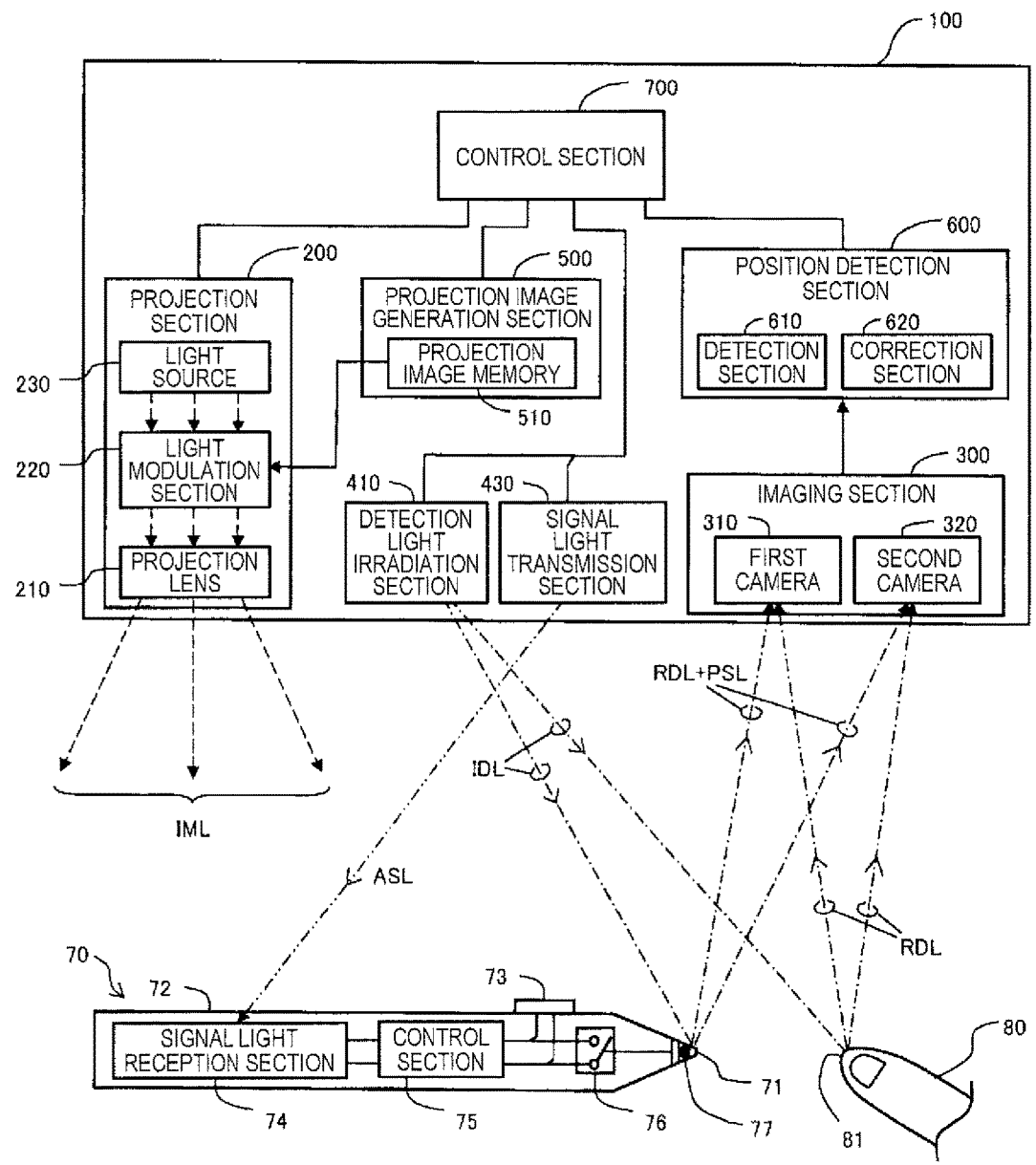
FIG. 3 is a block diagram showing an internal configuration of a projector.

FIG. 3 is a block diagram showing an internal configuration of the interactive projector 100 and the light-emitting pointing element 70. The projector 100 has a control section 700, a projection section 200, a projection image generation section 500, a position detection section 600, an imaging section 300, the detection light irradiation section 410, and a signal light transmission section 430.

The control section 700 performs control of each of the sections incorporated in the projector 100. Further, the control section 700 determines the content of the instruction performed on the projected screen PS by the pointing element (the light-emitting pointing element 70 or the non-light-emitting pointing element 80) detected by the position detection section 600, and at the same time commands the projection image generation section 500 to generate or change the projection image in accordance with the content of the instruction.

The projection image generation section 500 has a projection image memory 510 for storing the projection image, and has a function of generating the projection image to be projected on the screen surface SS by the projection section 200. It is preferable for the projection image generation section 500 to be further provided with a function as a keystone distortion correction section for correcting a keystone distortion of the projected screen PS (FIG. 2B).

The projection section 200 has a function of projecting the projection image, which has been generated by the projection image generation section 500, on the screen surface SS. The projection section 200 has a light modulation section 220 and a light source 230 besides the projection lens 210 explained with reference to FIGS. 2A and 2B. The light modulation section 220 modulates the light from the light source 230 in accordance with the projection image data supplied from the projection image memory 510 to thereby form projection image light IML. The projection image light IML is typically color image light including the visible light of three colors of RGB, and is projected on the screen surface SS by the projection lens 210. It should be noted that as the light source 230, there can be adopted a variety of types of light sources such as a light emitting diode or a laser diode besides a light source lamp such as a super-high pressure mercury lamp. Further, as the light modulation section 220, there can be adopted a transmissive or reflective liquid crystal panel, a digital mirror device, and so on, and there can also be adopted a configuration provided with a plurality of light modulation sections 220 for the respective colored light beams.

The detection light irradiation section 410 irradiates throughout the screen surface SS and the space in front of the screen surface SS with irradiating detection light IDL for detecting the tip portion of the pointing element (the light-emitting pointing element 70 or the non-light-emitting pointing element 80). As the irradiating detection light IDL, near infrared light, for example, is used. The detection light irradiation section 410 is put on only in a predetermined period including imaging timing of the cameras 310, 320, and is put off in other periods. Alternatively, it is also possible to arrange that the detection light irradiation section 410 is always kept in the lighting state while the system 900 is in operation.

The signal light transmission section 430 has a function of transmitting a device signal light ASL to be received by the light-emitting pointing element 70. The device signal light ASL is the near infrared signal for synchronization, and is periodically emitted from the signal light transmission section 430 of the projector 100 to the light-emitting pointing element 70. A tip light emitting section 77 of the light-emitting pointing element 70 emits pointing element signal light PSL (described later) as the near infrared light having a predetermined light emission pattern (light emission sequence) in sync with the device signal light ASL. Further, when performing the position detection of the pointing element (the light-emitting pointing element 70 or the non-light-emitting pointing element 80), the cameras 310, 320 of the imaging section 300 perform imaging at predetermined timings synchronized with the device signal light ASL.

The imaging section 300 has the first camera 310 and the second camera 320 explained with reference to FIGS. 2A and 2B. As described above, the two cameras 310, 320 each have the function of receiving light in the wavelength region including the wavelength of the detection light to thereby perform imaging. In the example shown in FIG. 3, there is described the appearance in which the irradiating detection light IDL emitted by the detection light irradiation section 410 is reflected by the pointing element (the light-emitting pointing element 70 or the non-light-emitting pointing element 80), and then the reflected detection light RDL is received by the two cameras 310, 320 to be imaged. The two cameras 310, 320 further receive the pointing element signal light PSL, which is the near infrared light emitted from the tip light emitting section 77 of the light-emitting pointing element 70, to thereby perform imaging. Imaging by the two cameras 310, 320 is performed in both of a first period, in which the irradiating detection light IDL emitted from the detection light irradiation section 410 is in an ON state (light-emitting state), and a second period in which the irradiating detection light IDL is in an OFF state (non-light-emitting state). It is possible for the position detection section 600 to determine which one of the light-emitting pointing element 70 and the non-light-emitting pointing element 80 corresponds to each of the pointing elements included in the images by comparing the images in the respective two types of periods with each other.

It should be noted that at least one of the two cameras 310, 320 is preferably provided with a function of performing imaging using the light including the visible light in addition to a function of performing imaging using the light including the near infrared light. By adopting this configuration, it is possible to take images of the projected screen PS projected on the screen surface SS with the cameras to make it possible for the projection image generation section 500 to perform the keystone distortion correction using the images. Since the method of the keystone distortion correction using one or more cameras is well known, the explanation thereof will be omitted here.

The position detection section 600 has a function of determining the three-dimensional position of the tip portion of the pointing element (the light-emitting pointing element 70 or the non-light-emitting pointing element 80) by making use of triangulation using the images taken by the two cameras 310, 320. On this occasion, the position detection section 600 also determines which one of the light-emitting pointing element 70 and the non-light-emitting pointing element 80 corresponds to each of the pointing elements in the images using the light emission pattern of the light-emitting pointing element 70.

In the present embodiment, the position detection section 600 has a detection section 610 and a correction section 620. The detection section 610 has a function of detecting the three-dimensional coordinate value of the pointing element by the triangulation using the images including the pointing element 80 (or 70) taken by the two cameras 310, 320, and a function of detecting presence or absence of the contact of the pointing element with the projected screen PS (the screen surface SS). The correction section 620 has a function of correcting at least one of a Z-coordinate value of the screen surface SS, a Z-coordinate value of the pointing element 80 (or 70) obtained by the triangulation, and a difference threshold value δZth (described later) used for the contact determination based on the history of the Z-coordinate value of the pointing element 80 (or 70). These functions will further be described later.

The light-emitting pointing element 70 is provided with a signal light reception section 74, a control section 75, a tip switch 76, and the tip light emitting section 77 besides the button switch 73. The signal light reception section 74 has a function of receiving the device signal light ASL having been emitted from the signal light transmission section 430 of the projector 100. The tip switch 76 is a switch to be set to the ON state when the tip portion 71 of the light-emitting pointing element 70 is pushed, and set to the OFF state when the tip portion 71 is released. The tip switch 76 is normally in the OFF state, and is set to the ON state when the tip portion 71 of the light-emitting pointing element 70 has contact with the screen surface SS due to the contact pressure thereof. When the tip switch 76 is in the OFF state, the control section 75 makes the tip light emitting section 77 emit light with a specific first light emission pattern representing the fact that the tip switch 76 is in the OFF state to thereby emit the pointing element signal light PSL having the first light emission pattern. In contrast, when the tip switch 76 turns to the ON state, the control section 75 makes the tip light emitting section 77 emit light with a specific second light emission pattern representing the fact that the tip switch 76 is in the ON state to thereby emit the pointing element signal light PSL having the second light emission pattern. Since the first light emission pattern and the second light emission pattern are different from each other, it is possible for the position detection section 600 to analyze the images taken by the two cameras 310, 320 to thereby determine whether the tip switch 76 is in the ON state or in the OFF state.

As described above, in the present embodiment, the contact determination on whether or not the tip portion 71 of the light-emitting pointing element 70 has contact with the screen surface SS is performed in accordance with the ON/OFF state of the tip switch 76. Incidentally, since the three-dimensional position of the tip portion 71 of the light-emitting pointing element 70 can be obtained with the triangulation using the images taken by the two cameras 310, 320, it is also possible to perform the contact determination of the tip portion 71 of the light-emitting pointing element 70 using the three-dimensional position.

The button switch 73 of the light-emitting pointing element 70 has the same function as that of the tip switch 76. Therefore, the control section 75 makes the tip light emitting section 77 emit the light with the second light emission pattern described above in the state in which the user holds down the button switch 73, and makes the tip light emitting section 77 emit the light with the first light emission pattern described above in the state in which the button switch 73 is not held down. In other words, the control section 75 makes the tip light emitting section 77 emit the light with the second light emission pattern described above in the state in which at least one of the tip switch 76 and the button switch 73 is in the ON state, and makes the tip light emitting section 77 emit the light with the first light emission pattern described above in the state in which both of the tip switch 76 and the button switch 73 are in the OFF state.

It should be noted that it is also possible to arrange that a different function from that of the tip switch 76 is assigned to the button switch 73. For example, in the case in which the same function as that of a right-click button of the mouse is assigned to the button switch 73, when the user holds down the button switch 73, an instruction of the right click is transmitted to the control section 700 of the projector 100, and the process corresponding to the instruction is executed. In the case in which the different function from that of the tip switch 76 is assigned to the button switch 73 as described above, the tip light emitting section 77 emits light with four light emission patterns different from each other in accordance with the ON/OFF state of the tip switch 76 and the ON/OFF state of the button switch 73. In this case, it is possible for the light-emitting pointing element 70 to transmit the four combinations of the ON/OFF states of the tip switch 76 and the button switch 73 to the projector 100 while distinguishing the four combinations from one another.

The five specific examples of the signal light described in FIG. 3 are summed up as follows.

(1) Projection Image Light IML: the image light (visible light) projected on the screen surface SS by the projection lens 210 in order to project the projected screen PS on the screen surface SS.

(2) Irradiating Detection Light IDL: the near infrared light with which the detection light irradiation section 410 irradiates throughout the screen surface SS and the space in front of the screen surface SS for detecting the tip portions of the pointing elements (the light-emitting pointing element 70 and the non-light-emitting pointing element 80).

(3) Reflected Detection Light RDL: the near infrared light reflected by the pointing elements (the light-emitting pointing element 70 and the non-light-emitting pointing element 80), and then received by the two cameras 310, 320 out of the near infrared light applied as the irradiating detection light IDL.

(4) Device Signal Light ASL: the near infrared light periodically emitted from the signal light transmission section 430 of the projector 100 in order to synchronize the projector 100 and the light-emitting pointing element 70 with each other.

(5) Pointing Element Signal Light PSL: the near infrared light emitted from the tip light emitting section 77 of the light-emitting pointing element 70 at the timing synchronized with the device signal light ASL. The light emission pattern of the pointing element signal light PSL is changed in accordance with the ON/OFF states of the switches 73, 76 of the light-emitting pointing element 70. Further, the unique light emission patterns for identifying the plurality of light-emitting pointing elements 70 are provided.

Figure 4A:
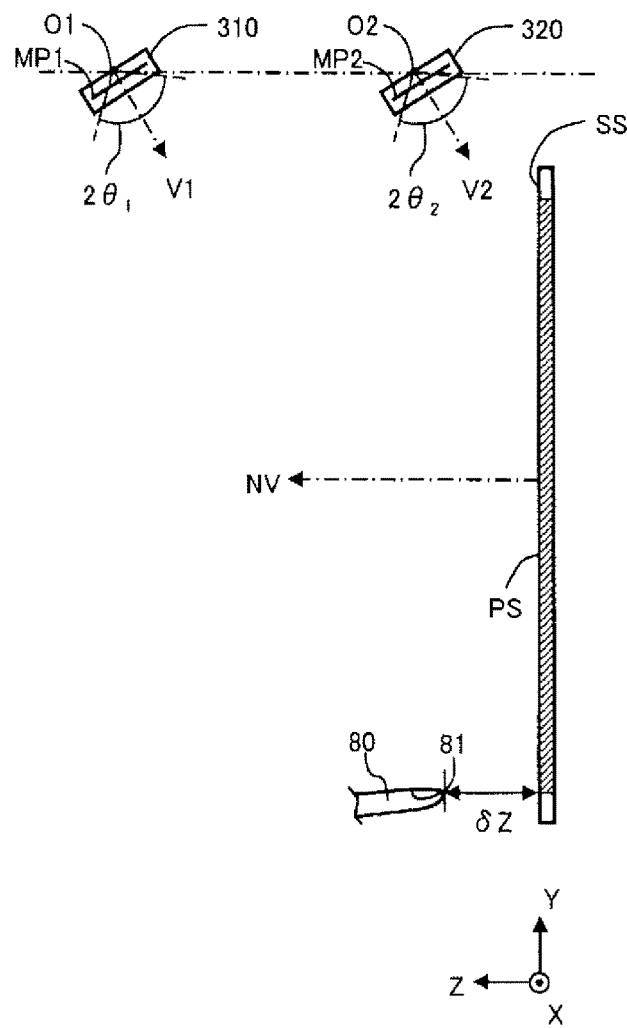
FIGS. 4A and 4B are explanatory diagrams showing an arrangement and orientations of two cameras.

FIG. 4A is an explanatory diagram showing an arrangement and directions of the two cameras 310, 320. The drawing shows an arrangement on the Y-Z plane passing through camera reference positions O1, O2 of the respective cameras 310, 320. The first camera 310 is disposed at a position with a longer vertical distance (distance in the Z direction) from the screen surface SS than in the case of the second camera 320. The two cameras 310, 320 are modeled using the camera reference positions O1, O2, image planes (imaging planes) MP1, MP2, optical axes V1, V2, and field angles $2\theta_1$, $2\theta_2$, respectively.

In FIG. 4A, there is drawn a state in which the tip portion 81 of the non-light-emitting pointing element 80 is distant as much as a distance $\delta Z$ from the projected screen PS. As described above, the three-dimensional position of the tip portion 81 of the non-light-emitting pointing element 80 is determined with the triangulation using the images taken by the two cameras 310, 320. In the interactive projection system 900, it is desired to accurately detect the distance $\delta Z$ in the Z direction between the tip portion 81 of the non-light-emitting pointing element 80 and the screen surface SS. Therefore, in the present embodiment, by devising the arrangement and the orientations of the two cameras 310, 320, there is improved the detection accuracy of the distance $\delta Z$ in the Z direction between the tip portion 81 of the non-light-emitting pointing element 80 and the screen surface SS. It should be noted that the detection accuracy of the distance $\delta Z$ in the Z direction is also referred to as "resolution of the Z coordinate."

In FIG. 4A, the second camera 320 is disposed at a position with a shorter vertical distance (distance in the Z direction) from the projected screen PS than in the case of the first camera 310. Further, the two cameras 310, 320 are disposed at positions identical in the Y direction (having the same height from the projected screen PS). Further, the optical axes V1, V2 of the two cameras 310, 320 are parallel to each other.

Figure 4B:
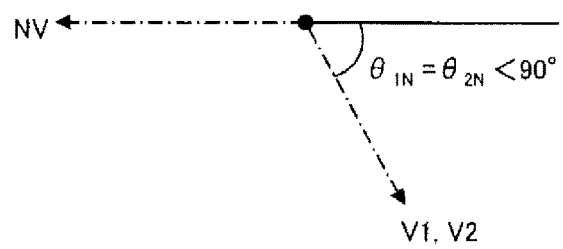

FIG. 4B shows a relationship between optical axis vectors V1, V2 of the two cameras 310, 320 and the projected screen normal vector NV. The optical axis vectors V1, V2 are obliquely tilted from the projected screen normal vector NV, and the angles $\theta_{1N}$, $\theta_{2N}$ formed between the respective optical axis vectors V1, V2 and the projected screen normal vector NV are smaller than 90°. Since the projected screen normal vector NV has the Z direction, these angles $\theta_{1N}$, $\theta_{2N}$ correspond to the angles formed between the directions of the respective optical axes V1, V2 and the Z direction. These angles $\theta_{1N}$, $\theta_{2N}$ can be set in a range larger than 0° and smaller than 90°, and are preferably set to a value in a range of 50° through 70°. In the present embodiment, by disposing the second camera 320 at the position closer to the projected screen PS than the position of the first camera 310, the resolution of the Z coordinate is improved.

It should be noted that regarding the second camera 320, since the smaller the angle $\theta_{2N}$ (FIG. 4B) of the optical axis V2 is set (the closer in the Z direction, the second camera 320 is made), the larger the image with the distance $\delta Z$ in the Z direction on the image plane MP2 becomes, the resolution of the Z coordinate increases. It should be noted that if the angle $\theta_{2N}$ is made excessively small, the width of the image in the Y direction of the projected screen PS on the image plane MP2 becomes excessively small, and therefore, the resolution of the Y coordinate is degraded. In consideration of a balance in the resolution between the Z coordinate and the Y coordinate based on these points, the angle $\theta_{2N}$ of the optical axis V2 of the second camera 320 is preferably set to a value in a range of 50° through 70°, and is more preferably set to a value in a range of 60° through 70°.

Regarding the first camera 310, the variation in the resolution of the Z coordinate due to the difference of the angle $\theta_{1N}$ of the optical axis V1 is smaller compared to the case of the second camera 320. It should be noted that the first camera 310 can obtain higher resolution with respect to the Y coordinate than in the case of the second camera 320. In contrast, the second camera 320 can obtain higher resolution with respect to the Z direction than in the case of the first camera 310. The resolution of the X coordinate is in roughly the same level between the two cameras 310, 320. It is preferable for the angles $\theta_{1N}$, $\theta_{2N}$ of the optical axes V1, V2 of the two cameras 310, 320 to respectively be set to the range in which the resolution balance between the Y coordinate and the Z coordinate is appropriate from a comprehensive point of view. Specifically, these angles $\theta_{1N}$, $\theta_{2N}$ are both preferably set to values in a range of 50° through 70°, and are more preferably set to values in a range of 60° through 70°. It should be noted that it is further preferable to set the optical axis V1 of the first camera 310 to be parallel to the optical axis V2 of the second camera 320, in the point that the calculation of the coordinate conversion in the triangulation can be simplified, and thus, the three-dimensional position of the pointing element can be determined with higher accuracy.

In the present embodiment, by disposing the second camera 320 at the position closer to the projected screen PS than the position of the first camera 310, the resolution of the Z coordinate can be improved, and at the same time, sufficiently high resolution can also be obtained with respect to the Y coordinate. It should be noted that it is also possible to set the positions (the Z coordinates) along the Z direction of the two cameras 310, 320 equal to each other. It should be noted that the positions (the X coordinates) along the X direction of the two cameras 310, 320 can be the same, or can also be different from each other. The same applies to the positions (the Y coordinates) along the Y direction of the two cameras 310, 320.

Incidentally, before using the projector 100 (e.g., when installing the projector 100), a calibration regarding the three-dimensional coordinate of the screen surface SS is performed in advance. The calibration is performed by, for example, the projection section 200 (FIG. 3) projecting a pattern of the calibration on the screen surface SS, the cameras 310, 320 being switched to a visible light shooting mode to image the pattern, and the detection section 810 detecting the coordinates of a plurality of places of the pattern in the taken images to determine the three-dimensional coordinate of the screen surface SS. When the calibration is completed, it becomes possible for the detection section 610 to determine whether or not the pointing element 80 has contact with the screen surface SS. It should be noted that there is a possibility that the Z-coordinate value of the screen surface SS and the Z-coordinate value obtained by the triangulation vary after the calibration due to the factor that the screen surface SS or the projector 100 moves, or the factor that an error due to a change in temperature of the equipment (e.g., the cameras 310, 320) occurs. When these Z-coordinate values vary, the accuracy of the contact detection of the pointing element 80 degrades to cause the problem that the contact state is determined despite the pointing element 80 being separated from the screen surface SS, or by contraries, the non-contact state is determined despite the pointing element 80 having contact with the screen surface SS. Therefore, in the present embodiment, correction of the Z-coordinate is performed based on the history of the Z-coordinate value of the pointing element 80 obtained by the triangulation.

Figure 5A:
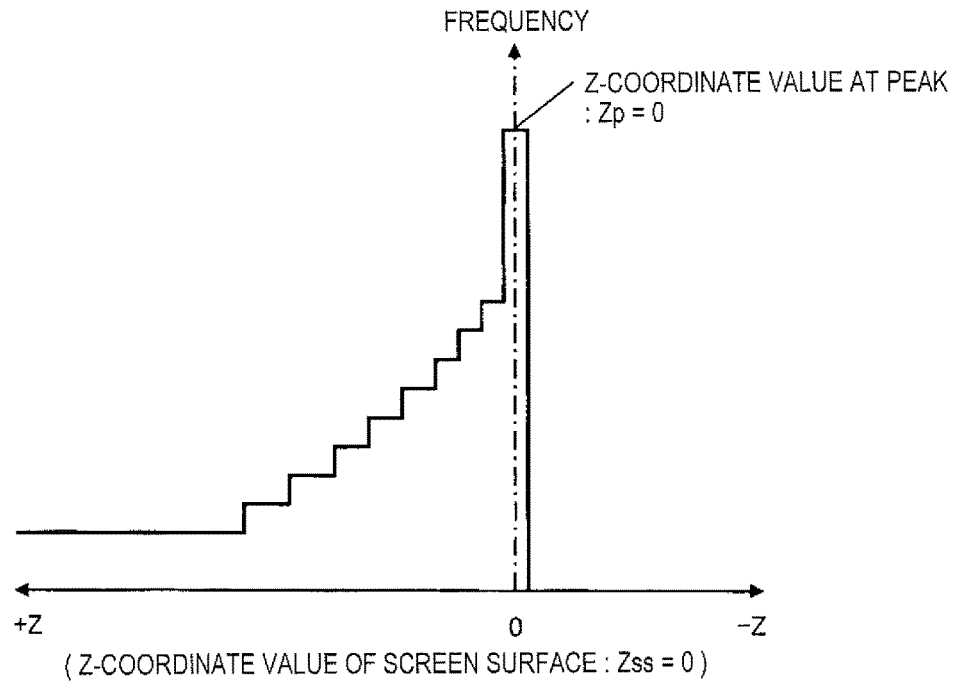
FIGS. 5A and 5B are explanatory diagrams each showing an example of a histogram of Z-coordinate values obtained by triangulation.
Figure 5B:
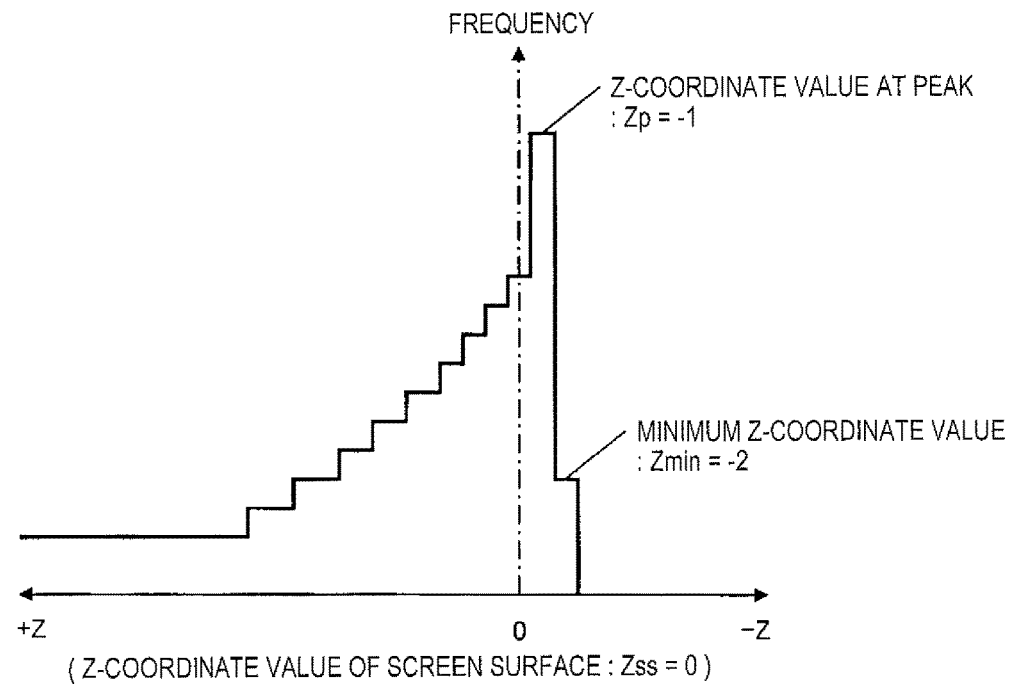

FIGS. 5A and 5B are explanatory diagrams each showing an example of a histogram of the Z-coordinate values of the pointing element 80 obtained by the triangulation. Here, the "Z-coordinate values of the pointing element 80 obtained by the triangulation" means the Z-coordinate values out of the three-dimensional coordinate values of the pointing element 80 detected by the detection section 610 (FIG. 3) irrespective of whether or not the pointing element 80 has contact with the screen surface SS. The detection section 610 updates the histogram of the Z-coordinate values every time the Z-coordinate value (to be precise, the Z-coordinate value of the tip portion of the pointing element 80) of the pointing element 80 is calculated by the triangulation in both of the contact state in which the pointing element 80 has contact with the screen surface SS and the non-contact state in which the pointing element 80 does not have contact with the screen surface SS. It should be noted that as described above, the Z-coordinate value Zss of the screen surface SS is corrected in advance in the calibration after installing the projector 100. In a typical example, the Z-coordinate value Zss of the screen surface SS after the calibration is set to zero. It should be noted that the Z-coordinate value Zss of the screen surface SS after the calibration is also referred to as a "known Z-coordinate value of the screen surface SS." When the Z-coordinate value of the screen surface SS is corrected by the correction of the Z coordinate described later, the value thus corrected becomes the "known Z-coordinate value of the screen surface SS."

FIG. 5A shows the histogram which can be obtained in the case in which there is no shift in the Z-coordinate value of the pointing element 80 obtained by the triangulation. In this example, the left side direction in FIG. 5A is defined as the +Z direction (the direction of getting away from the screen surface SS), and the right side direction is defined as the −Z direction (the direction toward the reverse side of the screen surface SS) in order to provide consistency with FIG. 4A. In the case in which there is no shift in the Z-coordinate value, the Z-coordinate value Zp representing the peak of the histogram is equal to the Z-coordinate value Zss (Zss=0 in this example) of the screen surface. The reason therefor is that if the user continues the operation of performing pointing on the screen surface SS (the projected screen PS) using the pointing element 80, the number of times of the trial in which the three-dimensional coordinate value of the pointing element 80 is successfully detected in the state in which the pointing element 80 has contact with the screen surface SS gradually increases. Therefore, since the Z-coordinate value of the pointing element 80 in the state of having contact with the screen surface SS becomes a certain value (0 in this example), the Z-coordinate value forms the peak of the frequency.

FIG. 5B shows the histogram which can be obtained in the case in which there is some shift in the Z-coordinate value of the pointing element 80 obtained by the triangulation. In this example, the Z-coordinate value Zp representing the peak of the histogram is shifted toward the minus side of the Z-coordinate value Zss (=0) of the screen surface. Further, the minimum Z-coordinate value Zmin of the histogram is located on the minus side of the Z-coordinate value Zp of the peak. In such a case, since the detection error in the contact detection of the pointing element 80 increases, it is preferable to correct the Z coordinate.

Figure 6:
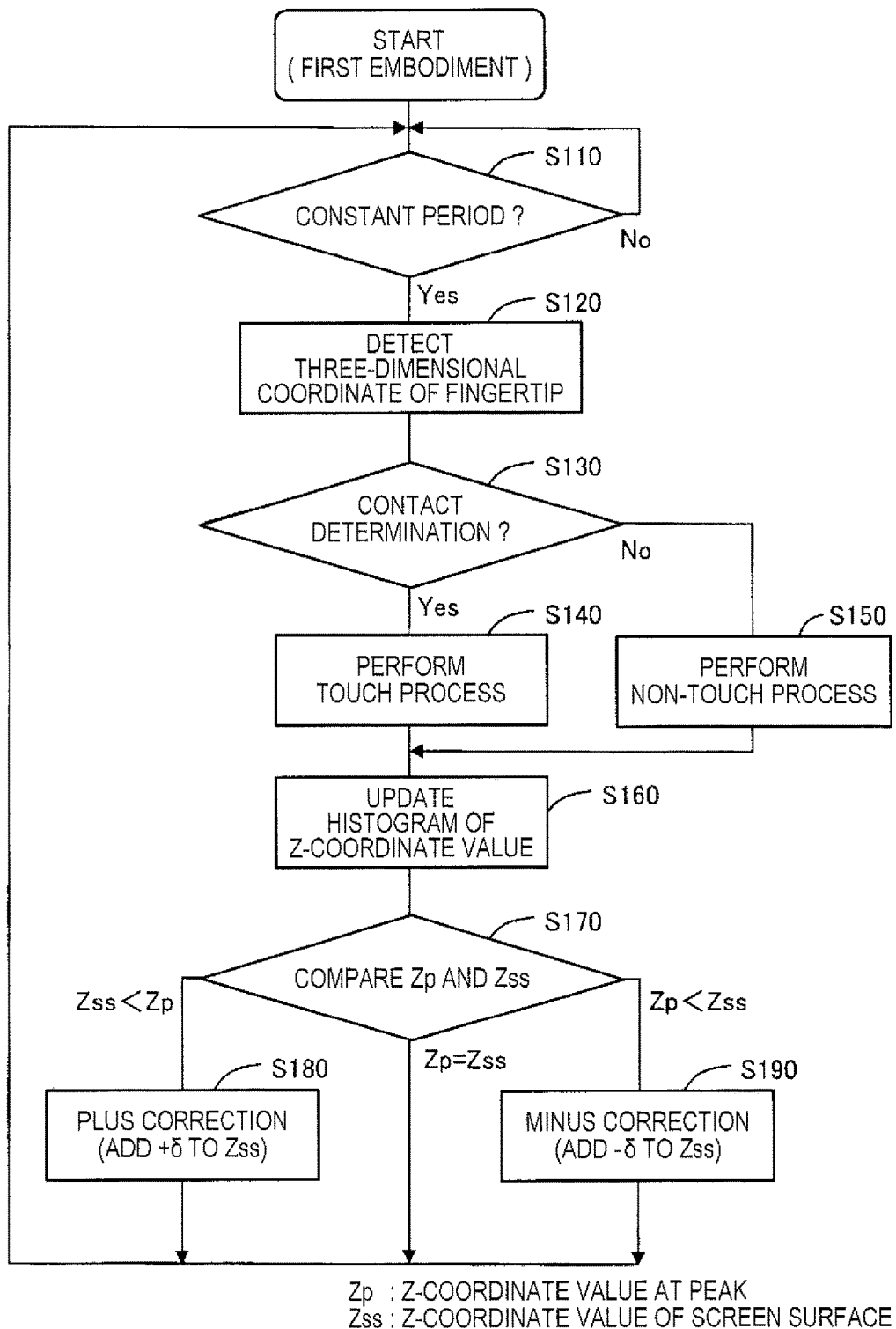
FIG. 6 is a flowchart of Z-coordinate correction according to a first embodiment of the invention.

FIG. 6 is a flowchart of the Z-coordinate correction according to the first embodiment. The whole of the process shown in FIG. 6 is performed every constant period (step S110). The constant period is set to, for example, a period corresponding to 60 through 240 times per second. In the following description, the case of using a fingertip as the pointing element 80 will be described. It should be noted that it is assumed that the calibration regarding the three-dimensional coordinate of the screen surface SS has previously been performed prior to the process shown in FIG. 6.

In the step S120, the detection section 610 (FIG. 3) detects the three-dimensional coordinate of the fingertip with the triangulation using the two cameras 310, 320. In the step S130, the detection section 610 determines whether or not the fingertip has contact with the screen surface SS. In general, the determination is performed as follows.

If $Zmes - Zss \leq \delta Zth$ is true, contact is determined. (1a)

If $\delta Zth < Zmes - Zss$ is true, non-contact is determined. (1b)

Here, Zmes denotes the Z-coordinate value of the fingertip detected by the triangulation, Zss denotes the known Z-coordinate value of the screen surface SS, and δZth is the difference threshold value.

In other words, in the contact determination, if the difference (Zmes−Zss) between the Z-coordinate value Zmes of the pointing element and the Z-coordinate value Zss of the screen surface SS is equal to or smaller than the difference threshold value δZth, contact is determined, and if the difference is larger than the difference threshold value δZth, non-contact is determined. It should be noted that as the difference threshold value δZth, for example, a value in a range of 3 through 5 mm is used.

In the case in which contact has been determined in the step S130, a touch process is performed in the step S140, and in the case in which non-contact has been determined, a non-touch process is performed in the step S150. Here, the "touch process" denotes a variety of processes performed when the pointing element has contact with the projected screen PS in accordance with the contact position. As the touch process, there can be cited a process such as drawing of a diagram (FIG. 2B), or selection of a tool. Further, the "non-touch process" denotes a variety of processes performed when the pointing element does not have contact with the projected screen PS in accordance with the three-dimensional position of the pointing element. As the non-touch process, there can be cited a process of, for example, updating the position on the projected screen PS and then redrawing the tools used in the pointing element. It should be noted that it is also possible to arrange that nothing is performed as the "non-touch process." It should be noted that the process corresponding to the steps S140, S150 is performed by the projection image generation section 500 (FIG. 3).

In the step S160, the correction section 620 (FIG. 3) updates the histogram using the Z-coordinate value obtained in the step S120. In the step S170, the correction section 620 compares the Z-coordinate value Zp of the peak of the histogram and the known Z-coordinate value Zss of the screen surface SS with each other, and then performs the correction of the Z coordinate in accordance with the comparison result as follows.

1. If Zss<Zp is true, a plus correction of the Z coordinate is performed (step S180). Specifically, for example, +δ is added to the Z-coordinate value Zss of the screen surface SS.

2. If Zss=Zp is true, the correction of the Z coordinate is not performed.

3. If Zp<Zss is true, a minus correction of the Z coordinate is performed (step S190). Specifically, for example, −δ is added to the Z-coordinate value Zss of the screen surface SS.

Here, "δ" denotes the minimum correction unit used in the correction of the Z coordinate, and is arbitrarily set in advance in accordance with the bit count of the Z-coordinate value. For example, the minimum correction unit δ can be set to a value corresponding to the difference between "0" and "1" in the least significant bit of the Z-coordinate value.

As shown in the example of FIG. 5B, in the case in which the Z-coordinate value Zp of the peak is smaller than the Z-coordinate value Zss of the screen surface SS, the minus correction is performed in the step S190. The reason thereof is that since it is conceivable that the Z-coordinate value Zp of the peak corresponds to the state in which the pointing element 80 (the fingertip) has contact with the screen surface SS as described with reference to FIGS. 5A and 5B, if the Z-coordinate value Zss of the screen surface SS is corrected toward the minus side in the case in which Zp<Zss is true, the Z-coordinate value Zss approaches the correct value. After then, by using the Z-coordinate value Zss thus corrected of the screen surface SS for the contact determination, the accuracy of the contact determination can be improved. In contrast, in the case in which the Z-coordinate value Zp of the peak is larger than the Z-coordinate value Zss of the screen surface SS, by performing the plus correction in the step S180, the accuracy of the contact determination can be improved.

It should be noted that in the steps S180, S190, the correction is performed with a constant minimum correction unit δ irrespective of the level of the difference (Zp−Zss) between the Z-coordinate value Zp of the peak and the Z-coordinate value Zss of the screen surface SS. By performing such a process, it is possible to prevent an unexpected problem (e.g., switching between the contact determination and the non-contact determination frequently occurs) from occurring due to the significant correction of the Z coordinate. Further, since the process shown in FIG. 6 is performed every constant period, even in the case in which the difference (Zp−Zss) is significantly large, the difference (Zp−Zss) gradually decreases and approximates to zero as the process shown in FIG. 6 is repeated a plurality of times, and therefore, there is no practical problem. It should be noted that as the correction value in the steps S180, S190, another correction value can also be used instead of using the minimum correction unit δ. For example, as the correction value, there can be used a value k|Zp−Zss| obtained by multiplying the absolute value |Z−Zss| of the difference between the Z-coordinate value Zp of the peak and the Z-coordinate value Zss of the screen surface SS by a coefficient k. Here, as the coefficient k, it is possible to use a value in a range, for example, not smaller than 0.6 and not larger than 1.0. By adopting this configuration, the correction of the Z coordinate can more promptly be completed.

When the correction process of the Z coordinate in the steps S170 through S190 is completed in such a manner, the process returns to the step S110, and the process of the steps S110 through S190 described above is repeatedly performed every constant period.

It should be noted that since the reliability of the histogram is low during the period low in the number of data of the Z-coordinate values, it is also possible to arrange that the correction of the Z-coordinate (the steps S170 through S190 in FIG. 6) is not performed. Specifically, it is also possible to arrange that the correction of the Z coordinate is performed after the time point when the number of data of the Z-coordinate values exceeds a predetermined number (e.g., 100). Further, in the case in which the X, Y coordinate values of the pointing element (the fingertip) obtained in the step S120 is not changed from the value in the previous trial, it is possible to arrange that the process (steps S160 through S190) on and after the addition to the histogram is not performed since there is a possibility that there arise some special circumstances. It should be noted that the process shown in FIG. 6 can be reset every time the power is applied to the projector 100, or it is also possible to arrange that the Z-coordinate value having been corrected is held in a nonvolatile memory (not shown) in the position detection section 600 even after the power of the projector 100 is turned off.

Further, the correction of the Z coordinate can also be performed in the state in which a single Z-coordinate value is assigned to the entire screen surface SS (or the projected screen PS), or can also be performed in the state in which the screen surface SS (or the projected screen PS) is divided into a plurality of small areas, and then a single Z-coordinate value is assigned to each of the small areas.

Figure 7A:
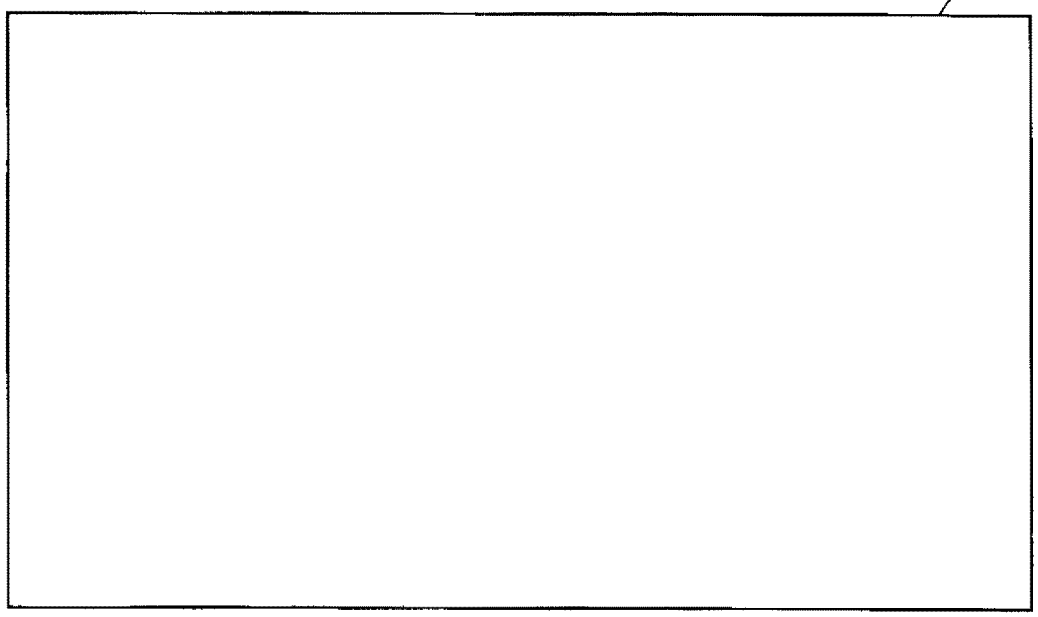
FIGS. 7A and 7B are explanatory diagrams each showing an example of sectioning of the Z-coordinate correction on the projected screen.
Figure 7B:
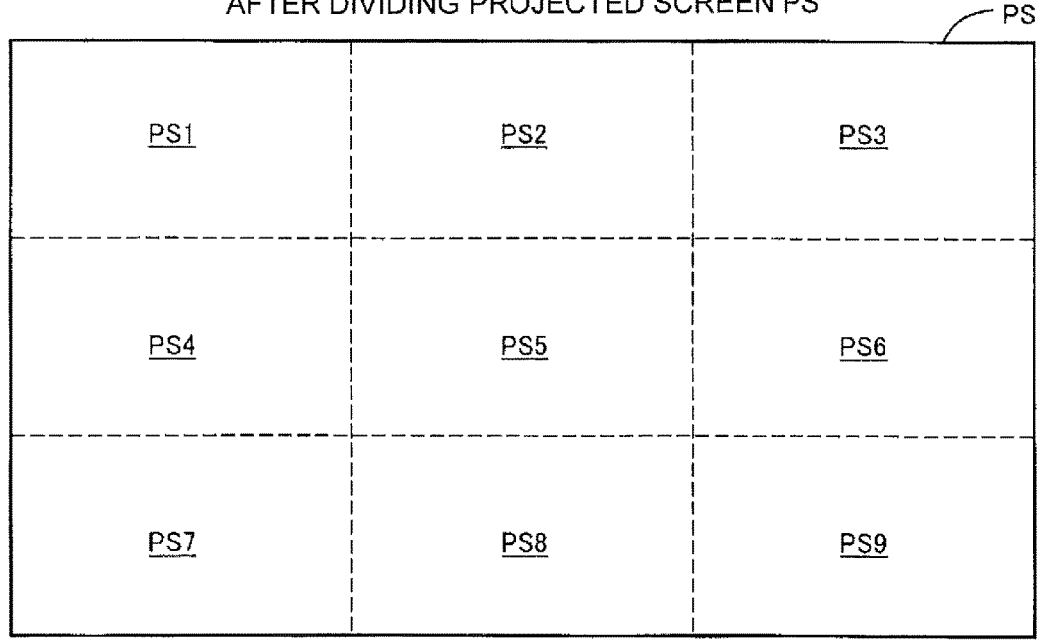

FIGS. 7A and 7B are explanatory diagrams each showing an example of sectioning of the Z-coordinate correction on the projected screen PS. In the example shown in FIG. 7A, the same Z-coordinate value is assigned to the whole of the projected screen PS, and the correction shown in FIG. 6 is performed on the Z-coordinate value. In the example shown in FIG. 7B, the projected screen PS is sectioned into a plurality of (9 here) small areas PS1 through PS9, and the correction of the Z coordinate is individually performed on each of these small areas PS1 through PS9. In the latter case, the histogram shown in FIG. 5 is also made for each of the small areas PS1 through PS9. It should be noted that in the case of sectioning the projected screen PS (or the screen surface SS) into the plurality of small areas PS1 through PS9, it is also possible to arrange that the Z-coordinate values thus corrected in the plurality of small areas PS1 through PS9 are interpolated to obtain localized Z-coordinate values throughout the entire projected screen PS (or the screen surface SS). For example, it is also possible to calculate the corrected Z-coordinate values by linear interpolation or polynomial approximation interpolation from the center of a certain small area (e.g., PS1) toward the center of an adjacent small area (e.g., PS2). The correction of the Z coordinate sectioned into the small areas described above can also be applied to other embodiments described below.

It should be noted that in the process shown in FIG. 6, although it is assumed that the correction of the Z coordinate is performed based on the Z-coordinate value Zp in the peak of the histogram of the Z-coordinate values of the pointing element, it is also possible to arrange that the correction of the Z coordinate is performed using other characteristic values obtained from the histogram. For example, it is also possible to perform the correction of the Z coordinate using an average value (a simple average value or a weighted mean) of the Z-coordinate value Zp in the peak of the histogram and the minimum Z-coordinate value Zmin. Since the state in which the pointing element has contact with the screen surface SS is generally reflected on the histogram of the Z-coordinate values of the pointing element, by arranging that the correction is performed based on the histogram, the presence or absence of the contact of the pointing element with the screen surface SS can accurately be detected.

As described above, in the first embodiment, since it is arranged that the Z-coordinate value Zss of the screen surface SS is corrected based on the histogram of the Z-coordinate values of the pointing element, it is possible to improve the accuracy of the contact detection of the pointing element with the screen surface SS.

B. Second Embodiment

Figure 8:
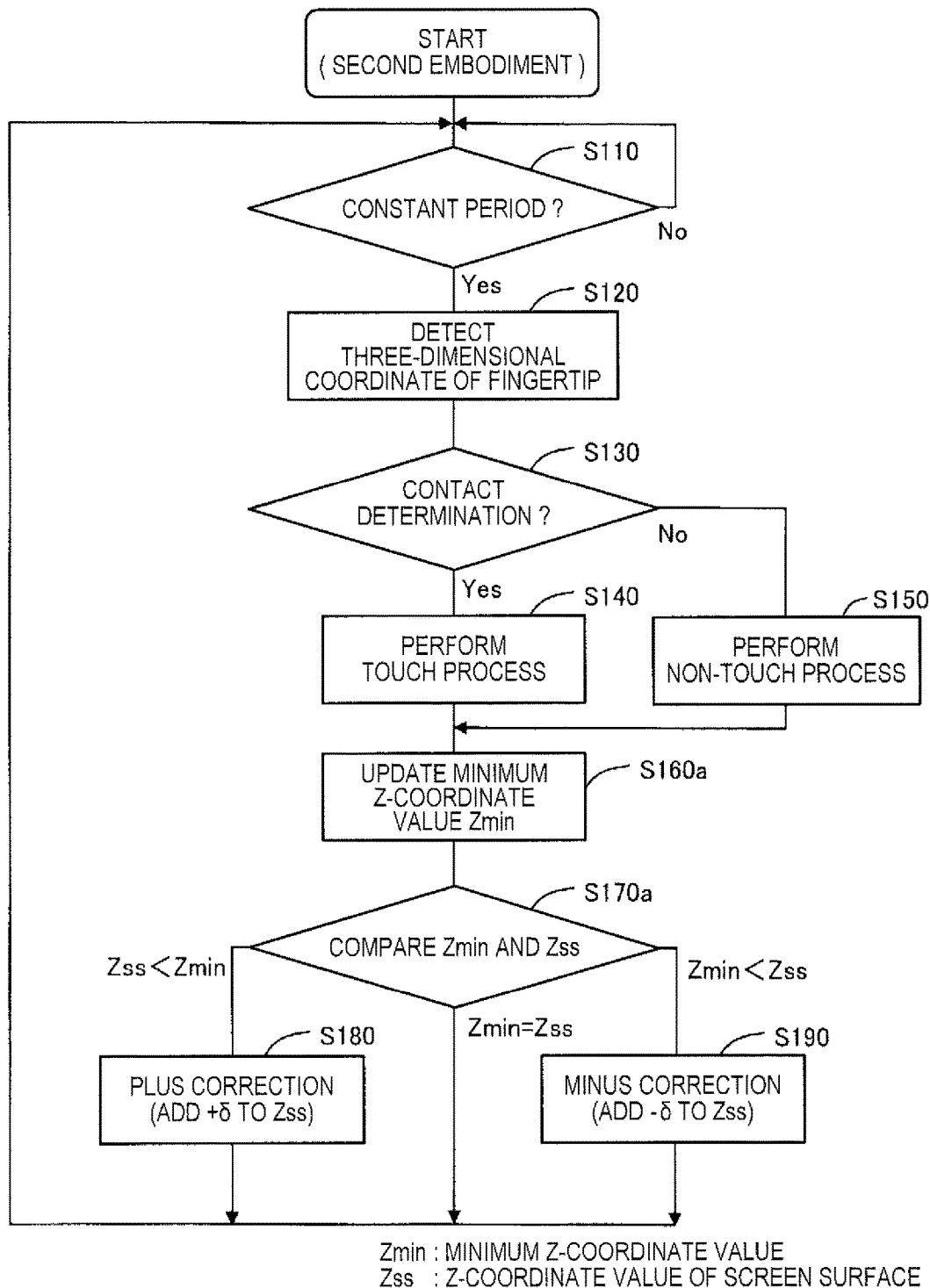
FIG. 8 is a flowchart of a Z-coordinate correction according to a second embodiment of the invention.

FIG. 8 is a flowchart of the Z-coordinate correction according to a second embodiment. The difference from the first embodiment shown in FIG. 6 is only the steps S160a, S170a, and the other steps thereof are the same as shown in FIG. 6.

In the step S160a, instead of the update (the step S160 in FIG. 6) of the histogram of the Z-coordinate values, the minimum Z-coordinate value Zmin is updated if need arises. Here, the "minimum Z-coordinate value Zmin" denotes the minimum value of the Z-coordinate values obtained in the history of a plurality of repetitions of the process shown in FIG. 6. Although the minimum Z-coordinate value Zmin appears in the histogram shown in FIG. 5B, it is not necessary to make the histogram for obtaining the minimum Z-coordinate value Zmin, and it is sufficient to simply register the minimum value of the history of the Z-coordinate values as the minimum Z-coordinate value Zmin. The update of the minimum Z-coordinate value Zmin in the step S160s is performed only in the case in which the Z-coordinate value of the fingertip obtained in the step S120 is smaller than the previous minimum Z-coordinate value Zmin.

In the step S170a, the correction section 620 compares the minimum Z-coordinate value Zmin and the known Z-coordinate value Zss of the screen surface SS with each other, and then performs the correction of the Z coordinate in accordance with the comparison result as follows.

1. If Zss<Zmin is true, a plus correction of the Z coordinate is performed (step S180).
2. If Zss=Zmin is true, the correction of the Z coordinate is not performed.
3. If Zmin<Zss is true, a minus correction of the Z coordinate is performed (step S190).

As a result of the correction, it becomes possible to perform the correction to the correct value even in the case in which the shift is caused in the Z-coordinate value similarly to the first embodiment.

The reason that the minimum Z-coordinate value Zmin is used in the second embodiment is that the minimum Z-coordinate value Zmin is roughly the same as the Z-coordinate value Zp of the peak of the histogram, and the difference between the both values is sufficiently small, and therefore, roughly the same correction effect can be obtained by using either of the both values. Further, in the case of using the minimum Z-coordinate value Zmin, it is not necessary to make the histogram, and therefore there is an advantage that the process is simpler.

As described above, in the second embodiment, since it is arranged that the correction of the Z coordinate is performed based on the minimum Z-coordinate value Zmin of the pointing element obtained by the triangulation, it is possible to improve the detection accuracy of the contact detection of the pointing element. It should be noted that the minimum Z-coordinate value Zmin has in common with the histogram used in the first embodiment in the sense that the both are the characteristics determined based on the history of the Z-coordinate values of the pointing element obtained by the triangulation. Therefore, it is understood that the first embodiment and the second embodiment have in common the point that the Z-coordinate value Zss of the screen surface is corrected based on the history of the Z-coordinate values of the pointing element.

C. Third Embodiment

Figure 9:
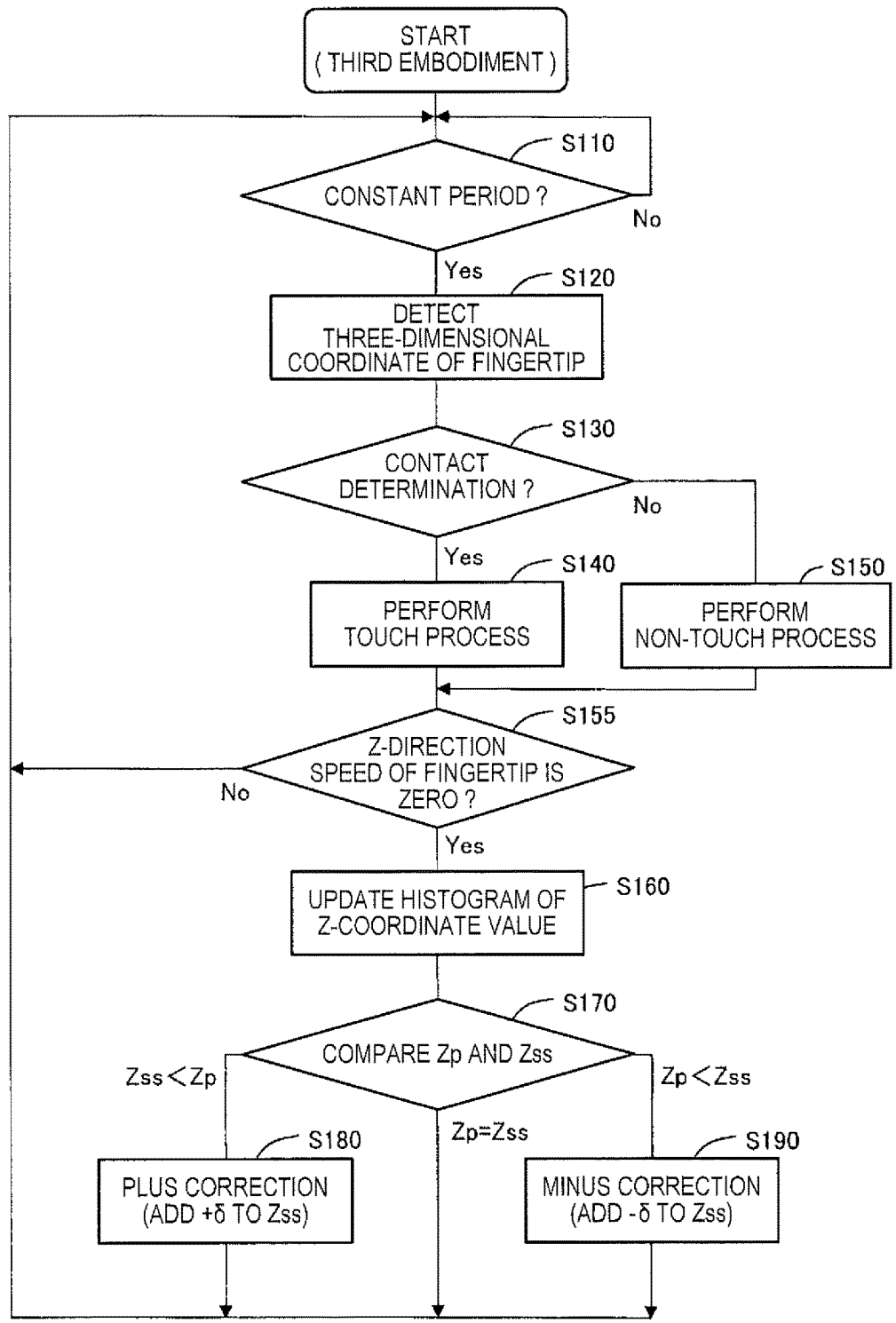
FIG. 9 is a flowchart of a Z-coordinate correction according to a third embodiment of the invention.

FIG. 9 is a flowchart of the Z-coordinate correction according to a third embodiment. The difference from the first embodiment shown in FIG. 6 is only the point that the step S155 is added between the steps S140, S150 and the step S160, and the other steps thereof are the same as shown in FIG. 6.

In the step S155, the correction section 620 determines whether or not the Z-direction speed of the fingertip is zero, and in the case in which the Z-direction speed of the fingertip is zero, the Z-coordinate correction process on and after the step S160 is performed, and on the other hand, in the case in which the Z-direction speed of the fingertip is not zero, the process returns to the step S110 without performing the Z-coordinate correction process. It should be noted that whether or not the Z-direction speed of the fingertip is zero can be determine in accordance with whether or not the difference between the Z-coordinate value of the fingertip obtained in the step S120 in the present trial, and the Z-coordinate value of the fingertip obtained in the step S120 in the process shown in FIG. 6 in the previous trial is zero. It should be noted that it is not necessary to strictly perform the determination whether or not the Z-direction speed is zero, and it is also possible to determine that the Z-direction speed is zero in the case in which the absolute value of the Z-direction speed is equal to or smaller than a minute allowable error.

The reason that the Z-coordinate correction process on and after the step S160 is performed only in the case in which the Z-direction speed of the fingertip is zero in the third embodiment is that it is conceivable that the Z-direction speed of the fingertip becomes zero if the fingertip has contact with the screen surface SS. In the third embodiment, since the histogram of the Z-coordinate values, which are obtained in the case in which the Z-direction speed of the fingertip is zero, is made, the reliability of the correction of the Z coordinate can be improved to a higher level than in the first embodiment. It should be noted that it is also possible to arrange that the Z-coordinate correction process on and after the step S160a is performed only in the case in which the Z-direction speed of the fingertip is zero in the second embodiment shown in FIG. 8 similarly to the third embodiment.

MODIFIED EXAMPLES

It should be noted that the invention is not limited to the specific examples and the embodiments described above, but can be implemented as various forms within the scope or the spirit of the invention, and the following modifications, for example, can also be adopted.

Modified Example 1

Although in the embodiments described above, it is assumed that the correction of the Z coordinate is performed in the case of using the fingertip (the non-light-emitting pointing element 80), it is also possible to arrange that the correction of the Z coordinate is performed similarly in the case of using the light-emitting pointing element 70. For example, it is also possible to arrange that the process explained with reference to FIG. 6, FIG. 8, of FIG. 9 is performed to perform the correction of the Z coordinate irrespective of whether the user uses the light-emitting pointing element 70 or the non-light-emitting pointing element 80. It should be noted that regarding the light-emitting pointing element 70, since it is also possible to perform the contact determination in accordance with the ON/OFF state of the tip switch 76 (FIG. 3), the advantage of the correction of the Z coordinate described above is more remarkable in the case of using the non-light-emitting pointing element 80.

Modified Example 2

As the method of the correction of the Z coordinate, it is possible to adopt either of the variety of methods described below.
 a. The Z-coordinate value Zss of the screen surface SS is corrected (the first embodiment).
 b. The Z-coordinate value of the pointing element obtained by the triangulation is corrected.
 c. The difference threshold value δZth used in the contact determination of the pointing element is corrected.
 d. Two or more of the methods a through c described above are performed at the same time.

It should be noted that since the correction of the Z coordinate is performed in order to improve the detection accuracy of the contact detection of the pointing element with the screen surface SS, roughly the same advantage can be obtained by adopting either of the methods a through d. It should be noted that in the case of performing two of the methods a through c at the same time, the correction amount of the Z-coordinate value in one trial becomes twice as large as the minimum correction unit δ. In contrast, if it is arranged that either one of the methods a through c is performed alone, the correction amount of the Z-coordinate value in one trial becomes equal to the minimum correction unit δ, and therefore, it is possible to decrease the correction amount per trial, and an unexpected excessive correction can be prevented.

Modified Example 3

Although in the embodiments described above, it is assumed that the projected screen PA is projected on the screen surface SS having a planar shape, it is also possible to assumed that the projected screen PS is projected on the screen surface SS having a curved-surface shape. Also in this case, since the three-dimensional position of the tip portion of the pointing element can be determined with the triangulation using the images taken by the two cameras, it is possible to determine the positional relationship between the tip portion of the pointing element and the projected screen. Further, in the case of using the screen surface SS having the curved-surface shape, by sectioning the projected screen PS (or the screen surface SS) into the plurality of small areas as shown in FIG. 7B, and correcting the Z coordinate with respect to each of the small areas, the accuracy of the contact detection can further be improved.

Modified Example 4

Although in the embodiments described above, it is assumed that the imaging section 300 for taking the image of the area (the projection range in which an image is projected) of the projected screen PS includes the two cameras 310, 320, the imaging section 300 can also include three or more cameras. In the latter case, the three-dimensional coordinate (X, Y, Z) of the pointing element is determined based on m (m is an integer equal to or greater than three) images taken by the m cameras. For example, it is possible to obtain the three-dimensional coordinates using $_mC_2$ combinations obtained by arbitrarily selecting two images out of the m images, and then obtain the final three-dimensional coordinate using the average value of the three-dimensional coordinates. By adopting this configuration, the detection accuracy of the three-dimensional coordinate can further be improved.

Modified Example 5

Although in the embodiments described above, the three-dimensional coordinate of the pointing element is detected with the triangulation using the plurality of cameras, it is also possible to arrange that the detection of the three-dimensional coordinate of the pointing element is performed using other devices. As the other devices for detecting the three-dimensional coordinate of the pointing element, it is possible to adopt, for example, a system of projecting structured light to the object to image the object, and a ToF (Time of Flight) system.

Although the embodiments of the invention is hereinabove explained based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

What is claimed is:

1. An interactive projector adapted to detect a position of a pointing element, comprising:
 a projection section adapted to project an image on a screen surface; and
 a processor programmed to:
  detect a three-dimensional coordinate value of the pointing element;
  detect presence or absence of contact of the pointing element with the screen surface based on a relationship between a difference between a Z-coordinate value of the pointing element and a Z-coordinate value of the screen surface, and a difference threshold value set in advance, a Z-coordinate being a coordinate in a direction of getting away from the screen surface;
  update a history of Z-coordinate values of the pointing element, when the presence or absence of contact of the pointing element with the screen surface is detected; and
  correct at least one of the Z-coordinate value of the screen surface, the Z-coordinate value of the pointing element, and the difference threshold value based on the updated history of Z-coordinate values of the pointing element.

2. The interactive projector according to claim 1, further comprising: a plurality of cameras each adapted to image a projection range, in which the image is projected, in the screen surface, wherein the processor is further programmed to:

detect the three-dimensional coordinate value of the pointing element with triangulation using a plurality of images that include the pointing element taken by the plurality of cameras.

3. An interactive projector adapted to detect a position of a pointing element, comprising:
a projection section adapted to project an image on a screen surface; and
a processor programmed to:
    detect a three-dimensional coordinate value of the pointing element;
    detect presence or absence of contact of the pointing element with the screen surface based on a relationship between a difference between a Z-coordinate value of the pointing element and a Z-coordinate value of the screen surface, and a difference threshold value set in advance, a Z-coordinate being a coordinate in a direction of getting away from the screen surface; and
    correct at least one of the Z-coordinate value of the screen surface, the Z-coordinate value of the pointing element, and the difference threshold value based on the a history of Z-coordinate values of the pointing element, wherein the processor is further programmed to: perform the correction based on a histogram of the historical Z-coordinate values of the pointing element.

4. The interactive projector according to claim 1, wherein the processor is further programmed to: perform the correction based on a histogram of the historical Z-coordinate values of the pointing element.

5. The interactive projector according to claim 1, wherein the processor is further programmed to: perform the correction in accordance with a magnitude relation between a minimum Z-coordinate value in the history of the Z-coordinate values of the pointing element and the Z-coordinate value of the screen surface.

6. The interactive projector according to claim 1, wherein the processor is further configured to: perform the correction based on the history of the Z-coordinate values of the pointing element in a case in which a Z-direction speed of the pointing element is zero.

7. A method of correcting a Z coordinate of an interactive projector capable of detecting a position of a pointing element using a plurality of cameras each adapted to image a projection range, the method comprising:
    detecting a three-dimensional coordinate value of the pointing element;
    detecting presence or absence of contact of the pointing element with the screen surface based on a relationship between a difference between a Z-coordinate value of the pointing element and a Z-coordinate value of the screen surface, and a difference threshold value set in advance, a Z-coordinate being a coordinate in a direction of getting away from the screen surface;
    updating a history of Z-coordinate values of the pointing element, when the presence or absence of contact of the pointing element with the screen surface is detected; and
    correcting at least one of the Z-coordinate value of the screen surface, the Z-coordinate value of the pointing element, and the difference threshold value based on the updated history of Z-coordinate values of the pointing element.

8. The interactive projector according to claim 4, wherein the processor is further programmed to: perform the correction in accordance with a magnitude relation between a Z-coordinate value representing a peak of the histogram of the historical Z-coordinate values of the pointing element and the Z-coordinate value of the screen surface.

* * * * *